United States Patent

Kuller et al.

[15] 3,683,277

[45] Aug. 8, 1972

[54] COMMUNICATION SYSTEM FOR BINARY CODED DATA

[72] Inventors: Lawrence Kuller; Sidney N. Jerson, both of St. Paul, Minn.

[73] Assignee: Astrocon Corporation, St. Paul, Minn.

[22] Filed: April 13, 1970

[21] Appl. No.: 27,649

[52] U.S. Cl. ......................325/30, 178/67, 178/69.5

[51] Int. Cl. ..............................................H04b 1/00

[58] Field of Search ....325/30, 320, 163; 178/66, 51, 178/67, 69.5; 332/9, 10; 329/104

[56] References Cited

UNITED STATES PATENTS

| | | | |
|---|---|---|---|
| 3,160,812 | 12/1964 | Scantlin | 325/30 |
| 2,977,417 | 3/1961 | Doelz et al | 178/51 |
| 3,263,185 | 7/1966 | Lender | 332/9 |

*Primary Examiner*—Albert J. Mayer
*Attorney*—Stryker and Jacobson

[57] ABSTRACT

A square-wave carrier signal is combined with a bi-level binary-coded data signal, which has a data bit time equal to the period of one cycle of carrier signal, to produce a phase-modulated carrier in which the phase of the second half of each cycle of carrier signal is shifted 180° only if the bit contained in the corresponding bit period is at a preselected one of its two possible levels representing either a binary "one" or "-zero" otherwise referred to as a mark or a space.

15 Claims, 5 Drawing Figures

INVENTORS
LAWRENCE KULLER
SYDNEY N. JERSON

BY Stryker and Jacobson
ATTORNEYS

COMMUNICATION SYSTEM FOR BINARY CODED DATA

BACKGROUND OF THE INVENTION

1. Field of the Invention

This invention is directed for use in the communication of binary-coded digital data from one location to another. Although it is primarily intended for use in wire communication to and from a central computer site, it may also be adaptable to wireless transmission.

2. Description of the Prior Art

A number of systems have been devised for the transmission and reception of digital data involving square-wave carrier and bi-level, binary-coded data signals. In these prior systems, as in the present system, at the transmitter the data signal modulates the carrier signal and the carrier is de-modulated at the receiver in order to read the transmitted data. In the systems devised heretofore, the polarity or magnitude of the modulated carrier signal has been used to represent the digital data. At the receiver, this information was identified or de-modulated by sensing the magnitude or polarity of the carrier signal at predetermined intervals of the carrier signal.

Some earlier systems are faced with a number of difficulties. An example is in the case of transmission media, such as transmission lines of some substantial length, which have characteristics which change the shape and form of the datamodulated carrier so drastically from that of the ideally transmitted waveform that specialized, complex and exotic detection circuits are necessary at the receiving end to be able to discriminate between the "zero" or space and "one" or mark values being transmitted. In the present system, exotic circuits are not used. Furthermore, in most of these other systems it has been necessary to provide some type of synchronizing signal for the sensing or detecting circuits at the receiving end by a control signal from the transmitting end to make sure that each data bit is sensed at the proper time interval in the carrier wave. Here again, the characteristics of the transmission line plays a significant role, not only because the timing signal has to be transmitted with the modulated carrier but also because of the deformations of the signal which could occur.

SUMMARY

An electronic timing chain, such as a crystal-controlled binary counter, produces a symmetrical square-wave carrier signal at a given frequency which is combined in a gating circuit with serialized, binary-coded, bi-level digital data signals. The output of the gating circuit is then strobed with a strobe signal produced by the timing chain but having a frequency twice that of the carrier signal. The strobed, data-combined carrier signal is fed into a bi-stable flip-flop and the output signal from the latter constitutes the transmitted carrier suitably phase-modulated by the data signal so that the phase of the second half of each carrier cycle is shifted 180° only if the bit value occurring during that corresponding bit period is a "one." The resulting output waveform always has a transition between upper and lower levels at the beginning of each carrier wave cycle. Where the data bit occurring during a carrier cycle is a mark no transition between upper and lower levels occurs during that carrier cycle time period. But if the data bit is a space, a transition will occur. At the receiving end, de-modulation of the carrier wave is accomplished merely by sensing whether or not there has been a transition during the interval or period of each carrier wave cycle. The direction, positive or negative-going, or magnitude of the modulated carrier is of no concern. Furthermore, regardless of the data bit value there is at least one transition for each period of a carrier cycle so the modulated transmitted signal provides its own synchronizing signal pulses to the receiver.

DESCRIPTION OF THE PREFERRED EMBODIMENT

Figure 1:
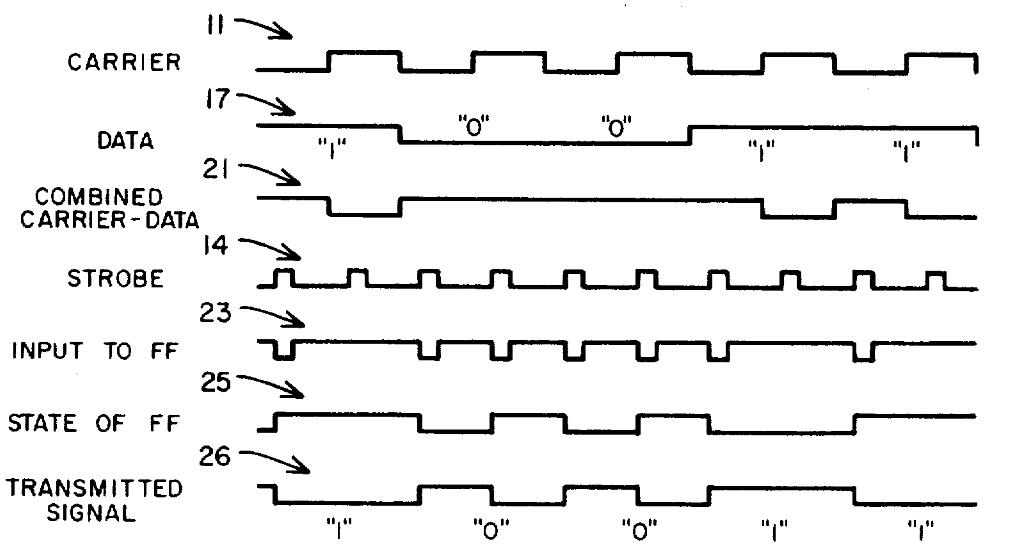
FIG. 1 shows the waveforms of the various signals in the transmitter or modulator.

A suitable timing chain 10 may consist of a number of bi-stable flip-flop stages **10*a*** arranged in seriatem to produce the type of signals needed in the present invention. The input to the timing chain may be crystal-controlled in order to assure an accurate signal output. Binary counters of this nature are well known in the art, so no detailed explanation of their operation is considered necessary. The signals could be produced in some other manner and the specific circuit arrangement is not considered essential to this invention.

The output of timing chain at **10*c* is a square-wave, symmetrical signal 11 (FIG. 1) which provides the proper waveform at a suitably selected frequency to serve as the carrier signal. Three additional outputs, 10*d*, 10*e* and 10*f*, are also selected as inputs to gate 12 which has its output serving as an input to another gate, 13, to produce a strobe signal 14 (FIG. 1) on line 15. The gates used in this embodiment of the invention are called "and" inverters. If all inputs to a gate are of the "one" or high level, the output will be a "zero" or low level signal. Gate 13 serves only to invert the signal output from gate 12 from one level to the other. Outputs 10*d***, *e* and *f*, are selected to produce a strobe signal waveform 14 of the nature shown in FIG. 1 which has a relatively short-duration, positive-going pulse at a frequency about twice that of the carrier signal 11. Here again, it should be understood that the manner of generating the strobe signal is a matter of choice but it is convenient in this embodiment to obtain it from the same timing chain which produces the carrier signal.

The binary-coded, digital data is fed serially, as illustrated by signal waveform 17 (FIG. 1), to an input of inverter 18. The output of the latter is combined with a start signal at the input to gate 19. The latter signal is used to control the data transmission by indicating that the receiving station is ready to receive data and the transmission system is ready to transmit it. The start signal is an "on-off" type of control signal. When the system is in the start or active or "on" condition, the output of gate 19 is an inversion of the signal at its input so, in essence, turns out to be a replica of the original data input signal 17. The latter is then combined with the carrier signal 11 in gate 20 and the latter produces an output waveform 21, (FIG. 1). The resulting combined carrier-data waveform 21 can be shown to represent the combined carrier and data signals by inspection of waveforms 11 and 17 in FIG. 1. For example, starting leftmost, the first half cycle of carrier 11 is at the low or "zero" level so gate 20 will produce a high or "one" level output during the corresponding period of signal 21. During the second half cycle of carrier signal 11, both it and data signal 17 are in the high or "one" level so the resulting output from gate 20 is in the low or "zero" level. It can be seen that the period or interval of the data bit is substantially equal to the period of one cycle of carrier signal. Continuing rightward, the next two serial data bits are at the "zero" level so that the corresponding period of the combined carrier-data waveform 21 is at the high or "one" level. The remainder of waveform 21 can be analyzed in the same fashion.

The combined carrier-data signal 21 is sensed or strobed by strobe signal 14 at the input to gate 22 with the output therefrom serving as an input signal, 23, to bi-stable flip-flop 24. As mentioned earlier, strobe signal 14 has a frequency about twice that of carrier wave 11 and has a relatively short-duration, positive going strobe pulse.

The first strobe pulse at the left of signal waveform 14 (FIG. 1) combines with the positive or "one" level of the combined carrier-data signal 21 to produce a negatively-going pulse in signal waveform 23 at the input to flip-flop 24. At the end of the pulse, the input to flip-flop 24 returns to the up level. The next strobe pulse finds carrier-data signal 21 at its low or "zero" level so the output of gate 22 and the input to flip-flop 24 remains at the upper level. The next five succeeding strobe pulses find signal-wave form 21 in the upper level and so the input to flip-flop 24 receives corresponding negative-going pulses. The rest of waveform 23 can be analyzed in a similar manner.

Flip-flop 24 is of any common variety and its internal circuit construction is merely a matter of choice and is of no special significance to the present invention. Suffice is to point out that the flip-flop is constructed so that it will change states each time a negative-going pulse appears at its input. The state of flip-flop 24 is illustrated as signal 25. If it is assumed that initially flip-flop 24 is in the arbitrarily chosen low or "zero" condition, the first negative-going input pulse switches it to the up or "one" condition and each succeeding negative-going input pulse switches it to the opposite condition. The output of flip-flop 24 is shown as signal waveform 26 which is merely an inversion of 25. Looking at the output signal waveform 26, it can be observed that during the interval or period of time corresponding to one data bit period, as described with respect to data signal 17 and its relationship to carrier signal 11, in which the corresponding data bit contains a "one," no transition of the signal occurs between the beginning and the end of the data bit period. However, during those intervals where the corresponding data signal contains a "zero," a transition between the upper and lower levels occurs about half way between the beginning and end of the data bit periods in output signal 26. So the data bits which are represented by magnitude or signal level in data signal waveform 17, upper level representing a "one" and lower level representing a "zero," are now represented by the presence or the absence of a transition during the data bit period in the output signal. In effect, what has taken place is a phase modulation of carrier wave form 11. This can be observed by comparing the output signal 26 to carrier waveform 11. In each carrier cycle where the corresponding data bit period is in the "one" condition, there is a 180° phase shift of the second half of the carrier cycle. Where the corresponding data bit is in the "zero" condition, no phase shift takes place. Taking, for example, the first cycle of carrier wave 11 and the corresponding data bit period being in the "one" level. The first half cycle of output waveform 26 is in the low level and ordinarily, if the output followed the carrier, there would be a transition of the signal to the upper level about midway in the cycle or period. However, here the carrier wave is shifted 180° so the output remains in the low level condition to the end of the period. An upward transition denotes the beginning of a new bit period of carrier cycle period and for the first half of the next cycle the output remains in the upper level. Since the corresponding bit period is in the low or "zero" condition, no apparent phase shift takes place so the output signal follows the carrier and makes a transition to the lower level. This analysis is applied to the remainder of the example to determine the resulting transmitted wave form.

It should be noted that there is a slight delay between the transitions in the carrier 11 and those that appear in output signal 26. This is caused by deliberately selecting strobe pulses which occur close to the beginning of each half cycle of carrier but just slightly displaced therefrom to make sure that the combined carrier-data signal 21 has had time to settle to its correct level.

Figure 3:
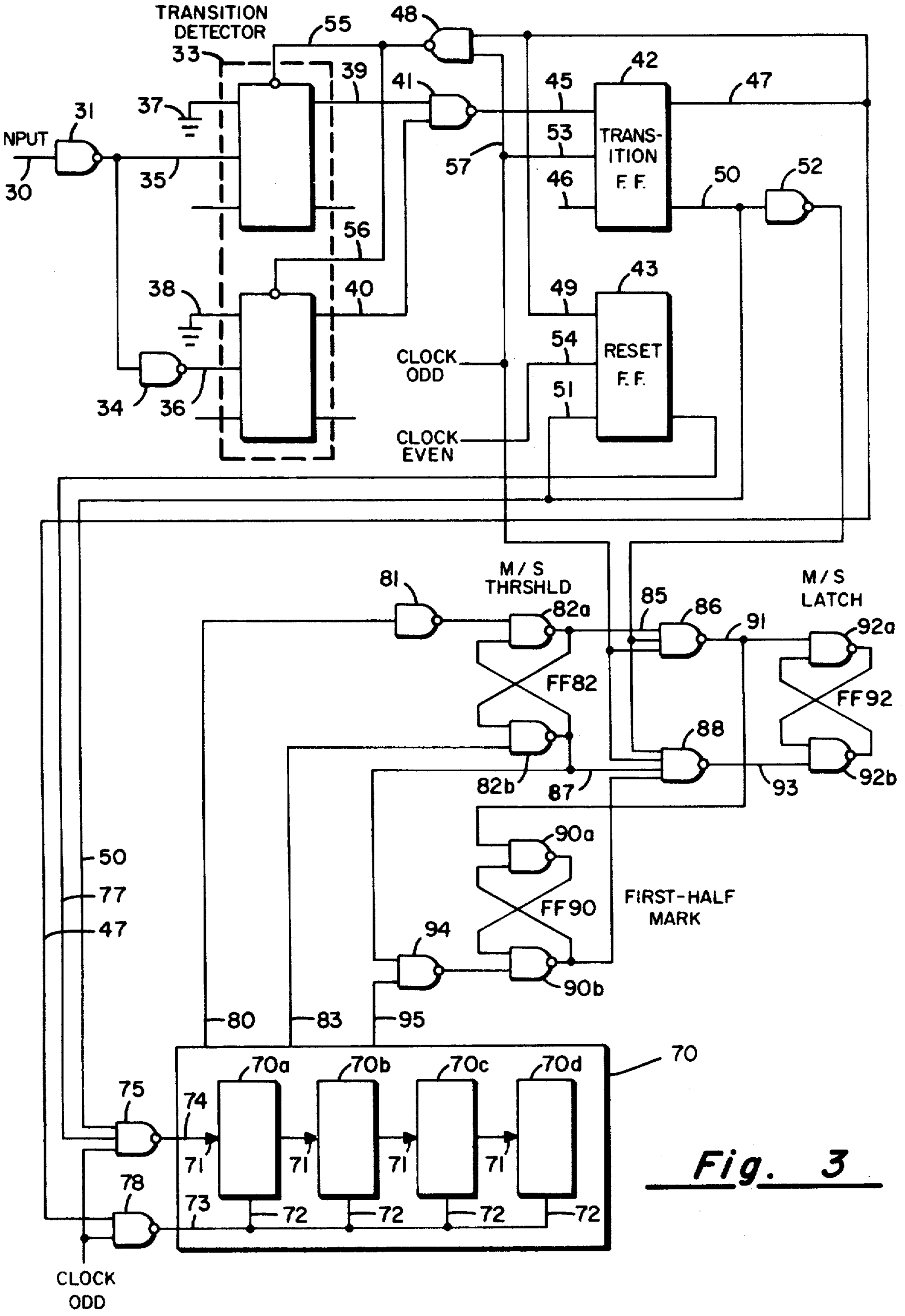
FIG. 3 is a block diagram schematic illustration of the circuit arrangement of the de-modulator.

Turning to the receiver or de-modulator, FIG. 3, the output signal from the transmitter provides an input signal 30*a* (FIG. 4) at line 30 to inverter 31. To make explanation easier, the data pattern of the input signal used here is different from that shown in output signal 26 described earlier. The output of inverter 31 provides an input at 35 to the top portion of transition detector 33 and an input to inverter 34. The output from the latter serves as an input 36 to the bottom portion of transition detector 33. Transition detector 33 is shown only in block form since its specific circuit is not considered essential to the present invention and the design of the circuit is a matter of choice. Suffice is to point out that the upper and lower portions of transition detector 33 are each capable of bi-stable operation and each will ordinarily respond only to negative-going transitional inputs at their respective toggle input terminals 35 and 36. The gating inputs, 37 and 38 respectively, to the upper and lower portions of transition detector 33 are grounded to make sure that negative-going input pulses appearing at their respective input terminals 35 and 36 will cause the circuit to set to only one desired condition. Outputs 39 and 40 from the upper and lower portions respectively of transition detector 33 serve as inputs to gate 41 which has its output connected as a gating input 45 to transition flip-flop 42. If it is assumed that at the start both inputs to gate 41 are "1's", it will produce a "0" output. A negative-going input applied to terminals 35 or 36 resulting from a transition of the input signal on line 30, produces a "0" or low level signal output on line 39 or 40 so that the output from gate 41 will correspondingly change to a "1." In this manner, then, transition detector 33 provides an output signal indication whenever there is a transition, either positive to negative or vice versa in the input signal.

Figure 4:
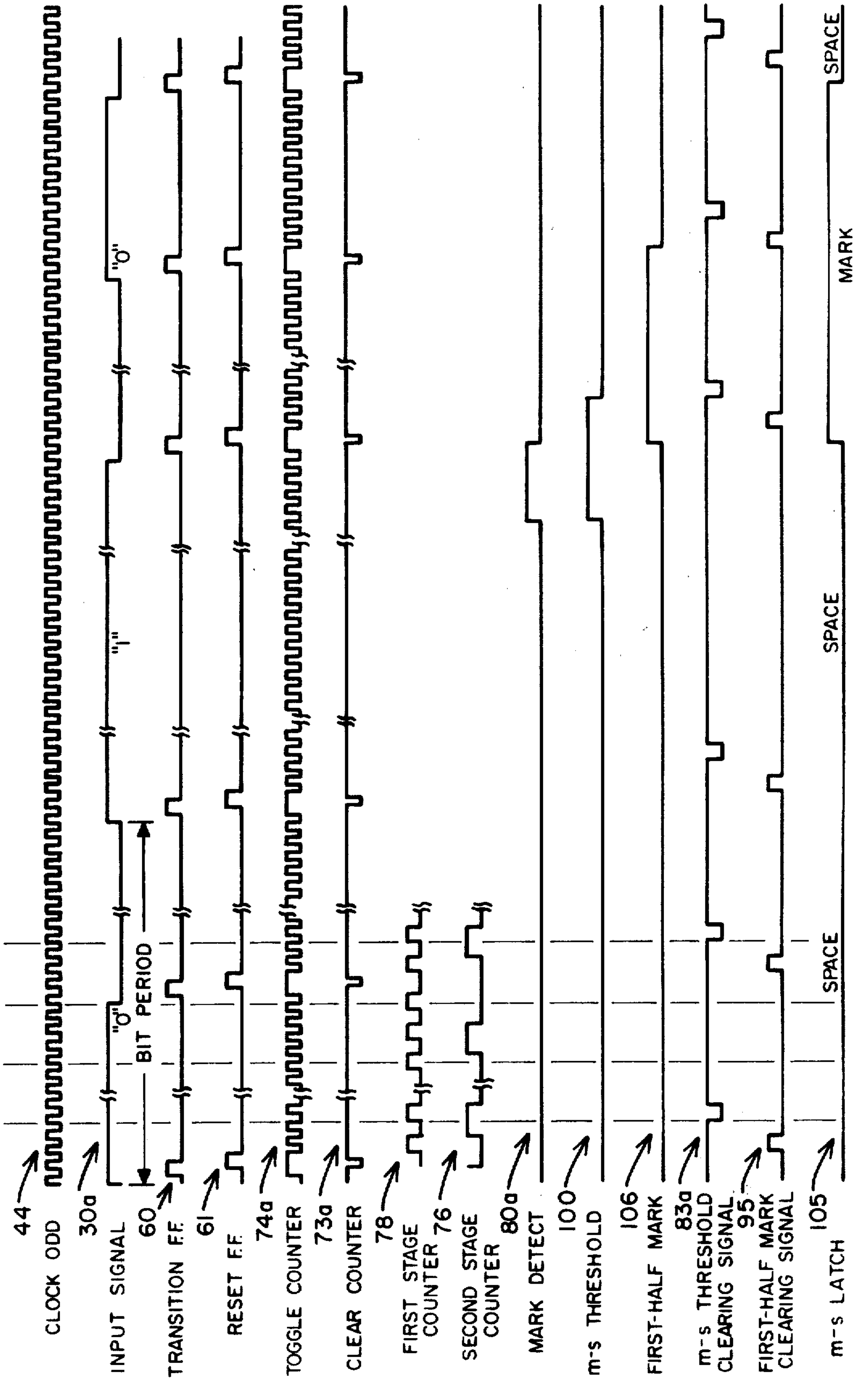
FIG. 4 illustrates various waveforms present in the de-modulator.

A clock signal 44, having the waveform characteristics shown in FIG. 4, is applied to toggle input 53 or transition flip-flop 42. Another clock pulse is applied to toggle input 54 of reset flip-flop 43. The clock signals are respectively identified as "odd" and "even" to indicate that they are 180° out of phase with one another. One gating input 45 of transition flip-flop 42 is connected to gate 41 and the other gating input, 46, is unconnected. Output line 47 from transition flip-flop 42 is connected as an input to gate 48 and also provides an input to the upper gating input 49 of reset flip-flop 43. Another output line 50 from transition flip-flop 42 provides an input to the lower gating input 51 of reset flip-flop 43 and also provides an input to inverter 52. A second input 57 to gate 48 is clock odd signal and the output from gate 48 is fed to the clear or reset inputs 55 and 56 of the upper and lower portions respectively of transition detector 33.

A negative-going transition at input terminal 35 of transition detector 33 produces a "0" or low level signal at output 39 so that the output of gate 41 goes to a "1" or high level. In this condition, the next succeeding negative-going clock odd pulse at toggle input 53 on flip-flop 42 sets the latter to the condition to produce an output on line 47. The latter serves two functions, one is to combine with the next succeeding clock odd pulse in gate 48 to produce a signal output which clears or resets the upper portion of transition detector 33 so it reverts to its original condition, and the other, activates input terminal 49 to reset flip-flop 43. The next succeeding clock even pulse causes the latter to change to its opposite condition. Resetting the upper half of transition detector 33 through gate 48, again changes the output of gate 41 back to the "0" condition so that the next succeeding clock odd pulse to the toggle input of transition flip-flop 42 sets the latter back to its initial condition.

The signal appearing at output terminal 50 of transition flip-flop 42 is opposite that appearing at terminal 47 and it also serves a dual purpose. One, it is merely inverted through inverter 52 to provide a signal indication of desired polarity when a transition occurs. This is the same as signal 60. The other, it is fed back to the lower gating input 51 of reset flip-flop 43 so that at the next clock even pulse, the latter will be switched back to its original state. An output produced at terminal 77 indicates the reset FF 43 being in its original or rest condition.

Turning now momentarily to FIG. 4, the significant waveforms are illustrated. The clock signal 44 can be assumed to be the clock odd signal. The clock even signal is not shown since it is merely the inverse of clock odd. Input signal 30a represents the occurrence of digital values "0," "1," and "0" or space, mark, space in that order from left to right. It should be understood that the drawing is not intended to show the frequencies of the signals except to show that the clock signal is of a considerably higher frequency than the input signal. The drawing does indicate the extent of a data bit period.

Looking at transition flip-flop signal 60, it can be seen that when the input signal 30a is positive-going (starting leftmost) the next succeeding negative-going clock odd pulse causes a change in state of the transition flip-flop 42 in the manner described earlier. The output signal from transition flip-flop 42 remains up only for a limited time, until the transition detector 33 is reset through gate 48. About half way through the first bit period, the negative-going transition of input signal *30a* causes a momentary change in the state of transition flip-flop 42 through the action of the lower portion of transition detector 33 and gate 41. Similarly, this up condition remains for only 1 clock cycle because of the resetting function of gate 48. The same analysis applied to the remainder of input signal *30a* shows that there is no change in the state of transition flip-flop 42 when a "1" or mark appears on the input signal. In that event, transitions occur only at the beginning and at the end of a data bit period. It can be easily seen that the reset flip-flop 43 follows the transition flip-flop 42 one-half clock cycle later since it is dependent upon the opposite clock phase. This is illustrated by signal wave form 61.

To summarize the de-modulator or receiver briefly to this point, transition flip-flop 42 produces a transition pulse signal output whenever a transition has occurred in the input data signal. Shortly after it produces a signal indication of this nature, the flip-flop is reset to be prepared to produce a signal denoting that another transition has occurred. The remaining function of the significant part of the de-modulator is to determine when the transitions occur to be able to differentiate between a "0" or a "1" being contained in the corresponding bit period. As described earlier, an intermediate transition occurring between the beginning and end of one carrier cycle or bit period, usually about halfway, indicates a "0" or space whereas the absence of an intermediate transition indicates a "1" or mark.

A binary counter or frequency divider 70 is made up of a number of bi-stable stages, *70a–d*. For ease of explanation only a four stage counter is shown but it should be understood that no limitation or significance thereto is intended. The particular circuit design for each stage of the counter is of no particular concern in the present invention since any of a number of different designs can be selected by one of ordinary skill. The counter operates in the usual fashion such that a pulse at the respective set inputs 71 cause the stage to switch to its opposite state. Each of the stages also has a clearing input 72. A clearing pulse applied to clear-counter line 73 forces each stage in the counter to be reset to what is arbitrarily designated its "0" or clear condition. Toggling pulses *74a* for the counter are applied to toggle input line 74 which is coupled to set input 71 of the lowest order or leftmost stage *70a*. The toggling pulses are produced at the output of gate 75 which has as its input the combination of the clock odd signal, output 77 from reset flip-flop 43, and output 50 from transition flip-flop 42. Counter-clearing pulses are applied to line 73 from the output of gate 78 which has at its input the combination of clock odd signal and output 47 from transition flip-flop 42.

The control and operation of counter 70 can best be understood by referring to the waveforms illustrated in FIG. 4. As explained earlier and as illustrated by waveforms 60 and 61, for the most part and during steady-state conditions, transition flip-flop 42 and reset flip-flop 43 are in the down condition so that their respective signal conditions on outputs 50 and 77 are in the up condition (opposite that shown by 60 and 61). Following a transition in the input data signal 30*a*, transition flip-flop 42, as illustrated by waveform 60, is set to its opposite or up state and holds there for approximately 1 clock cycle. Reset flip-flop 43, as illustrated by the signal waveform 61, follows the transition flip-flop 42 but delayed by one-half clock cycle. Therefore, during the steady-state condition of the input data signal 30a inputs 77 and 50 of gate 75 will be in the up condition and the output will follow the clock odd signal input to produce toggling pulses 74*a* on line 74. The counter 70 responds in the usual fashion as illustrated by signal waveforms 78 and 79 which respectively show the signal conditions of the lowest order and second lowest order stages of the counter. The frequency of the output from the lowest order stage is one-half that of the input, the frequency of the output of the second stage is one quarter that of the input, etc. Only when a suitable number of toggling pulses have been applied to input line 74 before a clearing pulse, will the counter be advanced or incremented enough to produce a signal output from higher order stages. The counter is allowed to continue incrementing for each input clock odd cycle until a transition in the data input signal is detected.

The number of stages in counter 70 and the toggling rate are selected so that the counter will not advance far enough to produce an output on line 80 until well over one-half of a bit period has elapsed. As described earlier, since the counter gets cleared and then starts recounting when a transition occurs in the data input signal 30*a*, if the toggling inputs are allowed to continue beyond the approximate halfway point of a data bit period without clearing the counter, it indicates the absence of a transition in the data input signal and therefore reflects that it contains a "1" or mark. Output 80 from counter 70 is identified as the mark detect output and when a pulse occurs in waveform 80*a*, it indicates that the counter has incremented beyond the half time of a bit period so that input data signal 30*a* contains a mark. It has been found that a suitable time to produce a mark detect output on line 80 is approximately three-quarters through a bit period. This signal provides an input to inverter 81 which in turn feeds an input to mark-space (*m-s*) threshhold flip-flop 82. This consists of a pair of gates 82*a* and 82*b* which are cross-coupled in the usual fashion. Once the flip-flop is set to a given state, it remains in that state until a clearing input is fed into 82*b*, the lower half of the flip-flop, at input line 83. A first output 85 from flip-flop 82 provides an input to gate 86 and a second output 87 provides an input to gate 88. The other inputs to gates 86 and 88 are clock odd and transition, which is an output from inverter 52 which constitutes an indication of the condition of transition flip-flop 42 as it appears in signal waveform 60. In addition, gate 88 has an input from first half mark flip-flop 90. The output from gate 86 appearing on line 91, provides an input to *m-s* latch flip-flop 92 and also an input to the first half mark flip-flop 90. Output 93 from gate 88 provides an input to the lower half of flip-flop 92. The latter is constructed in a fashion similar to *m-s* threshhold flip-flop 82 by a pair of cross-connected gates 92*a* and 92*b*. A signal input on line 91 sets flip-flop 92 to a first state and a signal on line 93 to 92*b* resets or clears the flip-flop. Referring back to the first half mark flip-flop 90, it is also constructed out of a pair of cross-coupled gates 90*a* and 90*b*. An input on line 91 into 90*a* sets the flip-flop. A signal on line 95 combined with an output on line 87 from the lower half of *m-s* threshhold flip-flop 82 at the input to gate 94 provides an input to 90*b* to reset or clear the flip-flop. The clearing input 83 to flip-flop 82 and clearing input 95 to flip-flop 90 are derived as outputs from the counter 70. The function of these clearing signals and their time of occurrence will become apparent during the course of the following description showing how the marks and spaces are detected and recognized.

The operation of the de-modulator will now be described, using the example of the illustrated data signal waveform being received, i.e., "0," "1," "0" or space, mark, space in that order. The transition at the beginning of the first data bit period produces a transition pulse from transition flip-flop 42, see signal waveform 60. Momentarily, there is an absence of a toggling pulse in waveform 74*a* and the presence of a clearing pulse in waveform 73*a* so that counter 70 is cleared. This is followed shortly by resumption of the toggling pulse inputs through gate 75 so that the counter re-assumes counting starting from zero. Looking at clearing signals 83*a* and 95*a*, it can be seen that pulses are produced by counter 70 sometime after the counter has resumed counting from zero. These clearing pulses will come into play later in the sequence of events.

During the first space, at approximately halfway through the data bit period a transition occurs which produces, in turn, another transition signal from flip-flop 42 which again clears counter 70. At the beginning of the next data bit period, the same events take place. So during the entire interval of the first space the counter is not allowed to count far enough to produce an output signal on line 80. Continuing on, the next data bit is a "1" or mark so there is no intermediate transition. Therefore, no positive-going pulse appears in waveform 60 so the counter is allowed to continue until it produces an output signal, 80*a*, designating detection of a mark. As stated earlier, the counter is arranged so that a mark detect pulse will occur approximately three-quarters of the way through a data bit period. The mark detect signal 80*a* sets the *m-s* threshhold flip-flop 82 through inverter 81, see signal waveform 100. The duration of the mark detect signal 80*a* is of no particular consequence since flip-flop 82 is constructed in a manner so that once it is set it remains set until a clearing or resetting signal is applied. Naturally, however, at the end of the data bit period, the transition in the data signal 30*a* results in counter 70 being cleared and, of course, this causes the mark detect signal 80*a* to disappear even if it had not done so earlier. However, the *m-s* threshhold flip-flop 82 remains set. Transition signal and clock odd signal combine with an output from 82 at gate 86 to set the *m*-

*s* latch flip-flop 92, see signal waveform 105, and the first half mark flip-flop 90, see signal waveform 106. Again counter 70 resumes counting by the applied toggle pulse inputs. Shortly thereafter a clearing pulse occurs in waveform 83*a* which clears or resets flip-flop 82. The pulse occurring in clearing signal waveform 95*a* just prior to that in 83*a* does not affect the first half mark flip-flop because it is anded into gate 94 with the condition of flip-flop 82 which, at this time of occurrence of pulse 95*a*, is still in the set condition. Things remain stable until the next subsequent transition which occurs at approximately the halfway point of the next data bit since it contains a "zero" or space. The earlier occurrence of a transition signal was not able to clear or rest the *m-s* latch flip-flop 92 through gate 88 because the first half mark flip-flop 90 was still in a set condition. However, now a pulse in clearing signal waveform 95a finds the *m-s* threshhold flip-flop 82 in the reset condition so that a clearing signal is applied to flip-flop 90 through gate 94 so that the first half mark flip-flop 90 is then in the reset condition. It will follow, then, that the next detected transition which occurs at the end of the present space, will produce a clearing pulse through gate 88 to clear or reset the *m-s* latch flip-flop 92 by applying a clearing signal to stage 92*b*. In this fashion, then, it can be seen that the output of the *m-s* latch flip-flop 92 will be a replica of the data signal which had been combined with the carrier in the modulator section. In this instance, flip-flop 92 produces, in sequence, space, mark and space with each respective bit value being delayed at the output one bit period from its appearance at the input to the de-modulator.

It might be well to briefly observe what occurs in the event of successive "ones" or marks in the received data signal. The transition at the end of the first mark will occur and function similar to that described in the earlier example. Those events, therefore, that take place as a result of that transition will also take place in the present example. However, no transition occurs in the half-way point of the next succeeding data bit period so no transition signal comes from transition flip-flop 42. The counter 70 continues to increment so no clearing pulse will be produced in signal waveforms 83*a* or 95*a*. The *m-s* threshhold flip-flop 82 will be in the cleared condition but the first half mark flip-flop 90 remains set. At approximately the three-quarter bit period a mark detect signal 80*a* is again produced setting the *m-s* threshhold flip-flop 82. The next transition of the data waveform, which would occur at the end of the second mark, produces the results described in the earlier example, if followed by a space. The result is that the *m-s* latch flip-flop 92 would have been in the set condition for two data bit periods. However, if there is a third successive mark, the same signals would come into play to prevent flip-flop 92 from changing state. In summary, it can be seen that it takes two transitions to set *m-s* flip-flop 92 to a condition to produce a representation of a "zero" or space but if, in the interval of time between the two transitions, a mark detect signal should occur, then flip-flop 92 cannot be set to a space-representing condition. From this it becomes apparent that the three quarter bit period as the time at which to produce the mark detect signal, is an arbitrary selection. However, it was chosen as being the optimum between the end of a data bit period where a transition always occurs and the half time of a bit period where a transition may occur.

Figure 2:
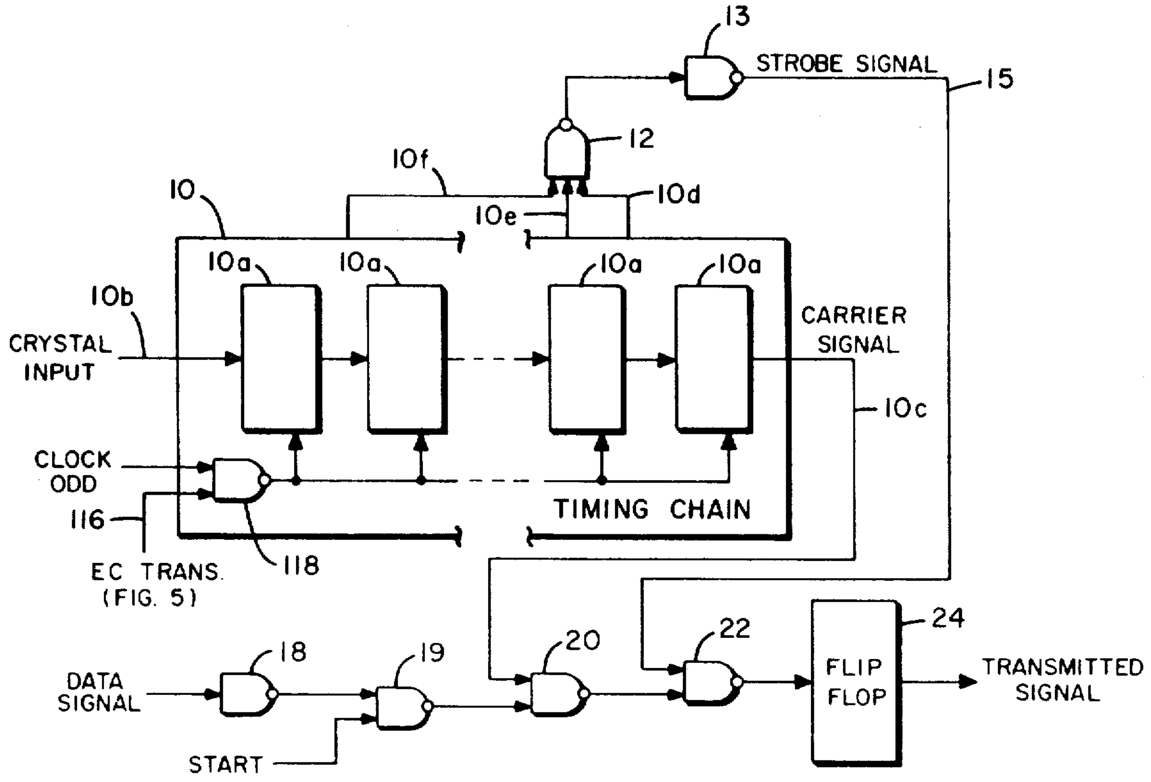
FIG. 2 is a block diagram schematic illustration of the circuit arrangement of the modulator.
Figure 5:
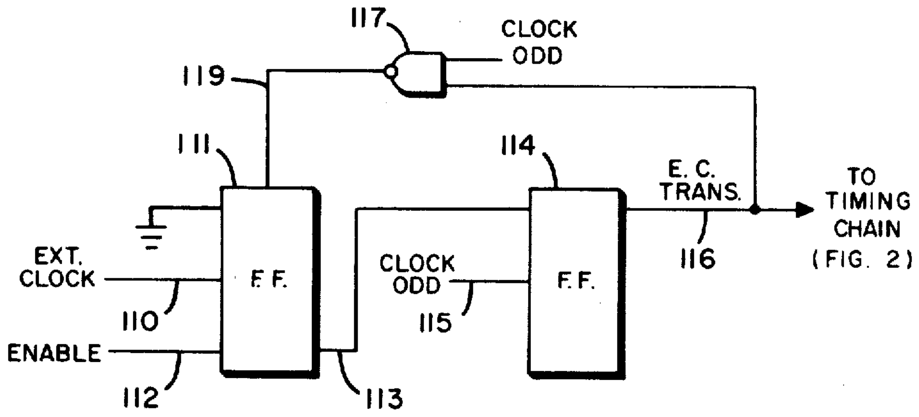
FIG. 5 is a block diagram of an external clock synchronizing circuit.

In the ordinary case, data signal train 17 (FIG. 1) is produced in a timed sequence as defined by an external clocking device. The frequency or repetition rate of the data signals should be approximately equal to that of the carrier signal 11. However, since the carrier signal and data signal train are produced by two independent sources, in order to combine the two signals in the manner described herein before, the timing chain 10 which produces the carrier signal 11 must be synchronized by the external clock which controls the frequency rate of the data signal. Referring to FIGS. 5 and 2, this is accomplished in the following fashion. The external clock, not shown, produces a square wave signal, not shown, which is applied to toggle input 110 of flip-flop 111. One side of FF 111 is grounded and the other side is enabled at input 112 when synchronization between the two timing sources is necessary. This is the usual case. Either the trailing or leading edge or transition of the external clock signal toggles flip-flop 111 to produce an output on line 113. Whether the leading or trailing edge is used is a matter of choice for the particular application. Line 113 is connected to one side of FF 114. The toggle input 115 of flip-flop 114 is connected to clock odd signal train source. When line 113 is in the up condition the next succeeding clock odd pulse on line 115 resets the flip-flop 114 to produce a signal output on line 116 which denotes the occurrence of a transition in the external clock signal. The signal on line 116 is fed back as an input to inverter 117 where it is combined with clock odd pulse. It is also fed to inverter 118 in timing chain 10 (FIG. 2) where it is also combined with clock odd pulse. With a signal present on line 116 the next succeeding clock odd pulse produces an output from inverter 117 which clears flip-flop 111 via line 119 to put it in condition to detect the next transition in the external clock signal train. Concurrently, inverter 118 produces an output signal which clears all the stages of timing chain 10. This has the effect then of initiating the sequence of operation of timing chain 10 at precisely the same time as the occurrence of a transition in the external clock signal and thereby synchronizes and locks the frequency of the former to that of the latter. For simplification, only the crystal input is shown as the toggling signal for timing chain 10 in FIG. 1 but ordinarily this is combined with an inverted output from flip-flop 114 so that the timing chain is not being toggled by the crystal input at the same time that it is being cleared through inverter 118. This helps prevent the occurrence of runt pulses.

A somewhat similar arrangement is used in the demodulator to produce a clock signal which is synchronized with the input signal received at the demodulator. This merely constitutes a multiple-stage counter, similar to 70 in FIG. 3, as a clock source which is synchronized by each transition of the modulated carrier received at input 30 (FIG. 3) connecting together a pair of flip-flops in the same fashion as described above. This clock signal is then used to combine with the output of the mark-space detection circuit for feeding the de-modulated data to a utility device, such as a computer, in a timed sequence.

We claim:

1. In a communication system for serialized bi-level, binary-coded data signals in combination:

a. means for producing a substantially square-wave, symmetrical, carrier signal;

b. A source of serialized bilevel data signal whose average bit period is substantially equal to 1 cycle of said carrier means for combining said carrier signal with the serialized bi-level data signal to change the phase of the second half of a carrier signal cycle by 180° only when the corresponding data signal is at a predetermined one of its two levels.

2. The invention as set forth in claim 1 wherein said signal combining means includes: gating means having said carrier signal, said data signal and a strobing signal as inputs; and means coupled to the output of said gating means for reproducing the carrier signal phase-modulated by the data signal.

3. The invention as set forth in claim 2 wherein said latter means comprises bistable switching means.

4. The invention as set forth in claim 3 wherein said strobing signal is a series of pulses occurring at twice the frequency of said carrier signal.

5. The invention as set forth in claim 4 wherein said gating means comprises: a first gating circuit having said data signal and said carrier signal as its inputs; and a second gating circuit having the output of said first gating circuit and said strobe signal as its inputs.

6. The invention as set forth in claim 5 wherein the output of said second gating circuit is coupled to the input of said bistable switching means, the output of the latter constituting the reproduced carrier signal phase-modulated by said data signal.

7. In a binary-coded digital-data communication system, the steps of: producing a fixed frequency carrier signal having substantially symmetrical, square-wave cycles; producing a series of bilevel data signals representing respective bit values and having average bit periods substantially equal to the period of a carrier-cycle; and combining each data signal with a carrier signal cycle to eliminate the intermediate transition during the cycle period of the latter only when the corresponding data signal is a selected one of its levels.

8. The invention as set forth in claim 7 further including the steps of: sensing the combined carrier-data signal to determine the presence or absence of an intermediate transition in each carrier cycle period, and producing a signal indication of the bit value of each sensed signal.

9. In a digital data communication system, the combination comprising: means for producing a binary data signal train comprising a series of bilevel signals having equal time periods with the start of each time period being denoted by a transition between levels and the binary value being represented by the presence or absence of an intermediate transition during a time period; means for receiving said signal train and for sensing the occurrence of each transition; timing means; and means responsive to said sensing means for initiating said timing means at a preset starting point whenever a transition occurs in said signal train.

10. The invention as in claim 9 further including: means coupled to said timing means for producing a signal output only when said timing means reaches a predetermined time interval from said starting point.

11. The invention as set forth in claim 9 wherein said signal producing means produces said signal train having an intermediate transition representing a first binary value and the absence of an intermediate transition representing a second binary value, said intermediate transition occurring at approximately one-half a time period.

12. The invention as set forth in claim 11 further including: means coupled to said timing means for producing a signal output indicating the occurrence of a second binary value when said timing means reaches an interval substantially beyond one-half a data bit time period but less than a complete data bit time period.

13. The invention as set forth in claim 12 wherein said receiving and sensing means comprises: means for receiving said signal train and for producing a signal indication for either a negative-going or positive-going transition in said signal train; and means coupled to said receiving means responsive to said transition signal indication for producing an output pulse signal whenever a transition occurs.

14. The invention as set forth in claim 9 wherein: said timing means comprises a binary counter; said sensing means initiating said timing means by clearing the counter when a transition occurs.

15. The invention as set forth in claim 14 further including: counter gating means; means for feeding a series of toggling pulses into said gating means, said toggling pulses occurring at a frequency substantially greater than the frequency substantially greater than the frequency of said data signal train; means for coupling said transition output pulse to an input of said gating means; and means for coupling the output of said gating means to the input of said counter hwereby the toggling of said counter is momentarily interrupted when a transition in the input data signal train occurs.

* * * * *